(12) United States Patent
Li et al.

(10) Patent No.: US 9,961,398 B2
(45) Date of Patent: May 1, 2018

(54) METHOD AND DEVICE FOR SWITCHING VIDEO STREAMS

(71) Applicant: BEIJING BAIDU NETCOM SCIENCE AND TECHNOLOGY CO., LTD., Beijing (CN)

(72) Inventors: Yongxing Li, Beijing (CN); Huifeng Shen, Beijing (CN); Jun Ge, Beijing (CN); Jingbo Huang, Beijing (CN); Xu Li, Beijing (CN)

(73) Assignee: BEIJING BAIDU NETCOM SCIENCE AND TECHNOLOGY CO., LTD., Haidian District Beijing (CN)

( * ) Notice: Subject to any disclaimer, the term of this patent is extended or adjusted under 35 U.S.C. 154(b) by 0 days. days.

(21) Appl. No.: 15/429,306

(22) Filed: Feb. 10, 2017

(65) Prior Publication Data

US 2018/0054649 A1    Feb. 22, 2018

(30) Foreign Application Priority Data

Aug. 17, 2016   (CN) .......................... 2016 1 0679649

(51) Int. Cl.
| | |
|---|---|
| *H04N 21/438* | (2011.01) |
| *H04N 21/2387* | (2011.01) |
| *H04N 21/472* | (2011.01) |
| *H04N 21/44* | (2011.01) |
| *H04N 21/234* | (2011.01) |
| *H04N 21/434* | (2011.01) |
| *H04N 21/433* | (2011.01) |

(52) U.S. Cl.
CPC ....... *H04N 21/4383* (2013.01); *H04N 21/234* (2013.01); *H04N 21/2387* (2013.01); *H04N 21/4331* (2013.01); *H04N 21/4345* (2013.01); *H04N 21/44* (2013.01); *H04N 21/47217* (2013.01)

(58) Field of Classification Search
None
See application file for complete search history.

(56) References Cited

U.S. PATENT DOCUMENTS

| | | | | |
|---|---|---|---|---|
| 2002/0191116 A1* | 12/2002 | Kessler | ............ | H04N 21/44004 348/723 |
| 2011/0161517 A1* | 6/2011 | Ferguson | ........... | H04N 7/17318 709/231 |
| 2012/0002721 A1* | 1/2012 | Berbecel | ............ | H04N 21/2365 375/240.03 |

* cited by examiner

*Primary Examiner* — Michael R Telan
(74) *Attorney, Agent, or Firm* — Miller, Matthias & Hull LLP (57) ABSTRACT

Disclosed is a method and device for switching video streams. The method comprises: acquiring video streams of a video in response to receiving a playback request for the video sent by a terminal, the video streams comprising: a video stream with a first group of pictures (GOP) frame number and a video stream with a second GOP frame number; sending the video stream with the first GOP frame number to the terminal, searching for a third key frame in the video stream with the first GOP frame number, and extracting a decoding time stamp (DTS) of the third key frame; searching the video stream with the second GOP frame number for a frame having an identical DTS; determining whether the frame is a fourth key frame in response to finding the frame having the identical DTS; and sending the video stream with the second GOP frame number to the terminal.

15 Claims, 5 Drawing Sheets

METHOD AND DEVICE FOR SWITCHING VIDEO STREAMS

CROSS-REFERENCE TO RELATED APPLICATION

This application claims the priority of Chinese Patent Application No. 201610679649.X, entitled "Method and Device for Switching Video Streams," filed on Aug. 17, 2016, the content of which is incorporated herein by reference in its entirety.

TECHNICAL FIELD

The present application relates to the field of computer technology, particularly, to the field of video playback technology, and more particularly, to a method and device for switching video streams.

BACKGROUND

Streaming media refers to a media format successively played in real time on the Internet by using a streaming transmission technology, for example, audio, video, or multimedia files. The streaming media technology is a network transmission technology in which successive images and sound information are compressed and put on a website server. A video server transmits packages to a user computer sequentially or in real time, such that the user downloads the packages while watching and listening, without the need to wait for downloading the whole compressed file to her own computer before watching.

However, in an existing streaming media server, a cache for a group of pictures (GOP) is generally provided on the server to improve the loading speed of a client player. After the client player sends a video playback request, the server may send the GOP in the cache to the client terminal, such that the client terminal may start playback immediately. Influenced by certain factors, the existence of the GOP may nevertheless delay the playback of the video. If the frame number in the GOP is set to be large, the caused delay for the video playback is also big. If the frame number in the GOP is set to be small, the caused delay of the video playback may be small, but the video quality may also be lower.

SUMMARY

An objective of the present application is to provide an improved method and device for switching video streams, to solve the technical problems mentioned in the Background.

In the first aspect, the present application provides a method for switching video streams, comprising: acquiring video streams of a video in response to receiving a playback request for the video sent by a terminal, wherein the video streams comprise: a video stream with a first GOP frame number and a video stream with a second GOP frame number, the GOP frame number being the frame number counting from a first key frame to a frame before a second key frame in a video stream, the second key frame being a subsequent key frame next to the first key frame, and the first GOP frame number being less than the second GOP frame number; sending the video stream with the first GOP frame number to the terminal, searching for a third key frame in the video stream with the first GOP frame number, and extracting a decoding time stamp (DTS) of third the key frame; searching the video stream with the second GOP frame number for a frame having an identical DTS; determining whether the frame is a fourth key frame in response to finding the frame having the identical DTS; and sending the video stream with the second GOP frame number to the terminal in response to determining the frame being the fourth a key frame.

In some embodiments, the acquiring video streams of the video comprises: acquiring the video stream with the first GOP frame number of the video from a cache of the video stream with the first GOP frame number, and storing the video stream with the first GOP frame number in a first sending queue; and acquiring the video stream with the second GOP frame number of the video from a cache of the video stream with the second GOP frame number, and storing the video stream with the second GOP frame number in a second sending queue.

In some embodiments, a ratio of the second GOP frame number to the first GOP frame number is a positive integer.

In some embodiments, the video stream with the first GOP frame number and the video stream with the second GOP frame number have identical sequence parameter sets.

In some embodiments, the searching for a third key frame in the video stream with the first GOP frame number comprises: acquiring identifiers of frames in the video stream with the first GOP frame number; and searching for the third key frame in the video stream with the first GOP frame number by using the identifiers.

In the second aspect, the present application provides a device for switching video streams, comprising: an acquisition unit configured to acquire video streams of a video in response to receiving a playback request for the video sent by a terminal, wherein the video streams comprise: a video stream with a first GOP frame number and a video stream with a second GOP frame number, the GOP frame number being the frame number counting from a first key frame to a frame before a second key frame in a video stream, the second key frame being a subsequent key frame next to the first key frame, and the first GOP frame number being less than the second GOP frame number; an extraction unit configured to send the video stream with the first GOP frame number to the terminal, search for a key frame in the video stream with the first GOP frame number, and extract a DTS of the key frame; a search unit configured to search the video stream with the second GOP frame number for a frame having an identical DTS; a determination unit configured to further determine whether the frame is a key frame in response to finding the frame having the identical DTS; and a sending unit configured to send the video stream with the second GOP frame number to the terminal in response to determining the frame being the fourth a key frame.

In some embodiments, the acquisition unit comprises: a first acquisition module configured to acquire the video stream with the first GOP frame number of the video from a cache of the video stream with the first GOP frame number, and store the video stream with the first GOP frame number in a first sending queue; and a second acquisition module configured to acquire the video stream with the second GOP frame number of the video from a cache of the video stream with the second GOP frame number, and store the video stream with the second GOP frame number in a second sending queue.

In some embodiments, a ratio of the second GOP frame number to the first GOP frame number is a positive integer.

In some embodiments, the video stream with the first GOP frame number and the video stream with the second GOP frame number have identical sequence parameter sets.

In some embodiments, the extraction unit comprises: an acquisition module configured to acquire identifiers of frames in the video stream with the first GOP frame number; and a search module configured to search for a key frame in the video stream with the first GOP frame number by using the identifiers.

In the method and device for switching video streams provided in the present application, two video streams, namely a video stream with a first GOP frame number and a video stream with a second GOP frame number, are prepared for a video, the first GOP frame number being less than the second GOP frame number; the video stream with the first GOP frame number is sent to a terminal first, a key frame of the video stream with the first GOP frame number is searched for, a DTS of the key frame is extracted, and then the video stream with the second GOP frame number is searched for whether there is a key frame identical to the DTS, and if there is a key frame identical to the DTS, the video stream with the second GOP frame number is sent to the terminal. The video stream with a smaller GOP frame number is switched to a video stream with a greater GOP frame number, and therefore, low delay of video playback is ensured, and the picture quality of the video is also improved.

BRIEF DESCRIPTION OF THE DRAWINGS

After reading detailed descriptions of non-limiting embodiments with reference to the following accompanying drawings, other features, objectives and advantages of the present application will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
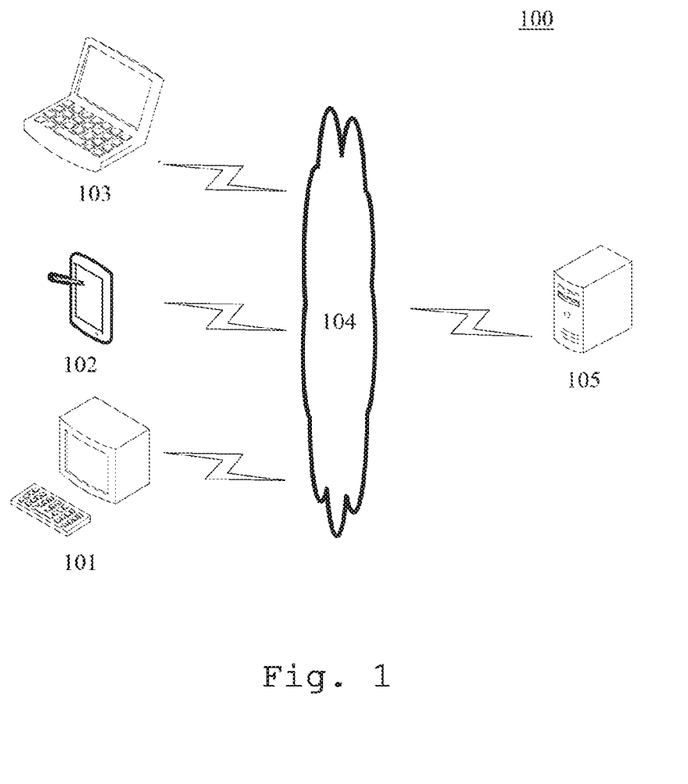
FIG. 1 is a diagram showing an exemplary system architecture in which the present application can be implemented.

FIG. 1 shows an exemplary architecture of a system 100 which may be used by a video stream switching method or a video stream switching apparatus according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as video players, network direct broadcast applications, video search applications, social platform software may be installed on the terminal devices 101, 102 and 103.

The terminal devices 101, 102 and 103 may be various electronic devices having a display screen and supporting the video playback, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend video server providing support to the video playback request from the terminal devices 101, 102 or 103. The storage server may perform a corresponding processing on data according to the received video playback request, and return a processing result (for example, video streaming data) to the terminal devices.

It should be noted that the video stream switching method according to the embodiments of the present application is generally executed by the server 105, and accordingly, a video stream switching apparatus is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
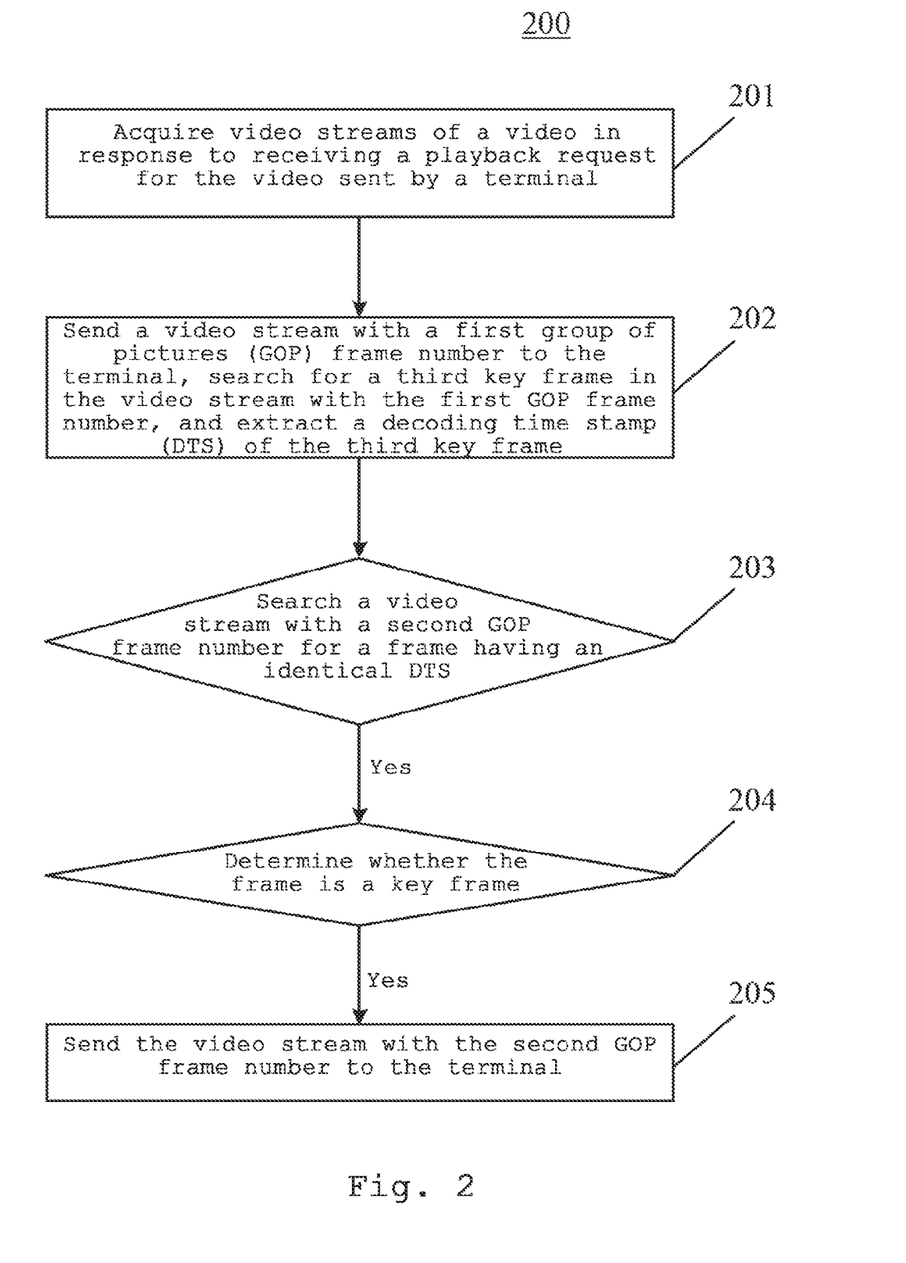
FIG. 2 is a flowchart of an embodiment of a method for switching video streams according to the present application.

Continue to refer to FIG. 2, a procedure 200 of an embodiment of a method for switching video streams according to the present application is shown. The method for switching video streams includes the following steps:

Step 201, video streams of a video are acquired in response to receiving playback request information of the video sent by a terminal.

In this embodiment, in response to receiving a playback request for a video sent by a user using a terminal in a wired connection approach or a wireless connection approach, an electronic device (for example, the server shown in FIG. 1) on which the method for switching video streams runs may acquire video streams of the video that the user requests to playback, where, the video stream refers to transmission of video data, for example, it can be processed through the network as a stable and successive stream, and due to streaming, a client browser or plug-in can display multimedia data before the whole file is transmitted completely. The video streams may include a video stream with a first frame number of group of pictures (GOP) and a video stream with a second GOP frame number, a GOP is a group of successive pictures, and the GOP frame number may be the frame number counting from a first key frame to a frame before a second key frame in a video stream, the second key frame being a subsequent key frame next to the first key frame, where the key frame may be referred to as an I frame, and may also be referred to as an Intra Picture, the I frame is generally the first frame of each GOP, which is moderately compressed to serve as a reference point of random access, and may also be considered as an image. The first GOP frame number should be less than the second GOP frame number.

As an example, when the video stream with the first GOP frame number is IBBPIBBPIBBP, where I denotes an I frame, B denotes a B frame, P denotes a P frame, the B frame is a bidirectional interpolation frame, the P frame is a forward prediction frame, the I frame is a complete picture, and the P frame and the B frame record changes relative to the I frame, the first GOP frame number is the frame number from the first I frame to a P frame before the second I frame, that is, the first GOP frame number is 4; the second GOP frame number should be greater than the first GOP frame number, and therefore, the second GOP frame number may be any GOP frame number greater than 4, for example, when the second GOP frame number is 5, the video stream with the second GOP frame number may be IBBBPIBBBBP.

In some alternative implementations of this embodiment, when the electronic device receives the playback request information of the video sent by the terminal device, the electronic device may acquire, from a cache of the video stream with the first GOP frame number, the video stream with the first GOP frame number of the video and store the video stream with the first GOP frame number in a first sending queue, and acquire, from a cache of the video stream with the second GOP frame number, the video stream with the second GOP frame number of the video and store the video stream with the second GOP frame number in a second sending queue. Before the electronic device acquires the video stream from the caches of the video stream, the electronic device may receive a frame of the video, when the frame of the video are received, the frame may be stored in the cache, and if the frame is an I frame, the frame in the cache may be cleared and the I frame is stored in the cache, so that the GOP cache has one, and only one, I frame, and the I frame is the first frame.

In some alternative implementations of this embodiment, a ratio of the second GOP frame number to the first GOP frame number may be a positive integer, for example, if the first GOP frame number is 30 frames, the second GOP frame number may be 60 frames, 90 frames, or the like.

In some alternative implementations of this embodiment, the video stream with the first GOP frame number and the video stream with the second GOP frame number may have identical sequence parameter sets (SPS). The SPS may also be referred to as a sequence parameter set, and the SPS is used to describe information that is not frequently changed in a video sequence. In H.264 decoding, a code stream is filtered first to obtain a parameter set, the parameter set is a method of enhancing the error recovery capability by improving the structure of a video stream, for example, severe negative effects may be caused to decoding when bits of some key information (for example, header information of a sequence) are lost; H.264 separates the key information out, and ensures that correct transmission is achieved in an error-prone environment by means of the design of the parameter set.

Step 202, the video stream with the first GOP frame number is sent to the terminal, a key frame in the video stream with the first GOP frame number is searched for, and a decoding time stamp (DTS) of the key frame is extracted.

In this embodiment, after the video stream with the first GOP frame number and the video stream with the second GOP frame number are acquired in Step 201, the electronic device may send the video stream with the first GOP frame number to the terminal device. In the process of sending the video stream, the electronic device may search for a key frame in the video stream with the first GOP frame number, and after the key frame is found, the electronic device may extract a DTS of the key frame. The DTS may also be referred to as a decoding time label. During code stream analysis of a digital television system, when packetized elementary streams (PES) of the digital television are analyzed, the PES has an unfixed length, and is generally of a length of an access unit. An access unit is a video frame, and may also be an audio frame. To implement synchronous decoding, a corresponding time mark, namely, the DTS, needs to be inserted before each section.

Step 203, the video stream with the second GOP frame number is searched for a frame having an identical DTS.

In this embodiment, the electronic device may search the video stream with the second GOP frame number for a frame having an identical DTS of the key frame in the video stream with the first GOP frame number extracted in Step 202. The electronic device may first extract a DTS of each frame in the video stream with the second GOP frame number; then, compare the DTS of each frame with the DTS of the key frame in the video stream with the first GOP frame number to check whether they are identical.

Step 204, it is further determined whether the frame is a key frame in response to finding the frame having the identical DTS.

In this embodiment, when it is found that there is a frame identical to the DTS in the video stream with the second GOP frame number, the electronic device may further determine whether the frame is a key frame.

Step 205, the video stream with the second GOP frame number is sent to the terminal in response determining the frame being the fourth a key frame.

In this embodiment, when it is determined that the frame is a key frame, the electronic device may send the video stream with the second GOP frame number to the terminal, and stop sending the video stream with the first GOP frame number, that is, switch the sending video stream from the video stream with the first GOP frame number to the video stream with the second GOP frame number.

Figure 3:
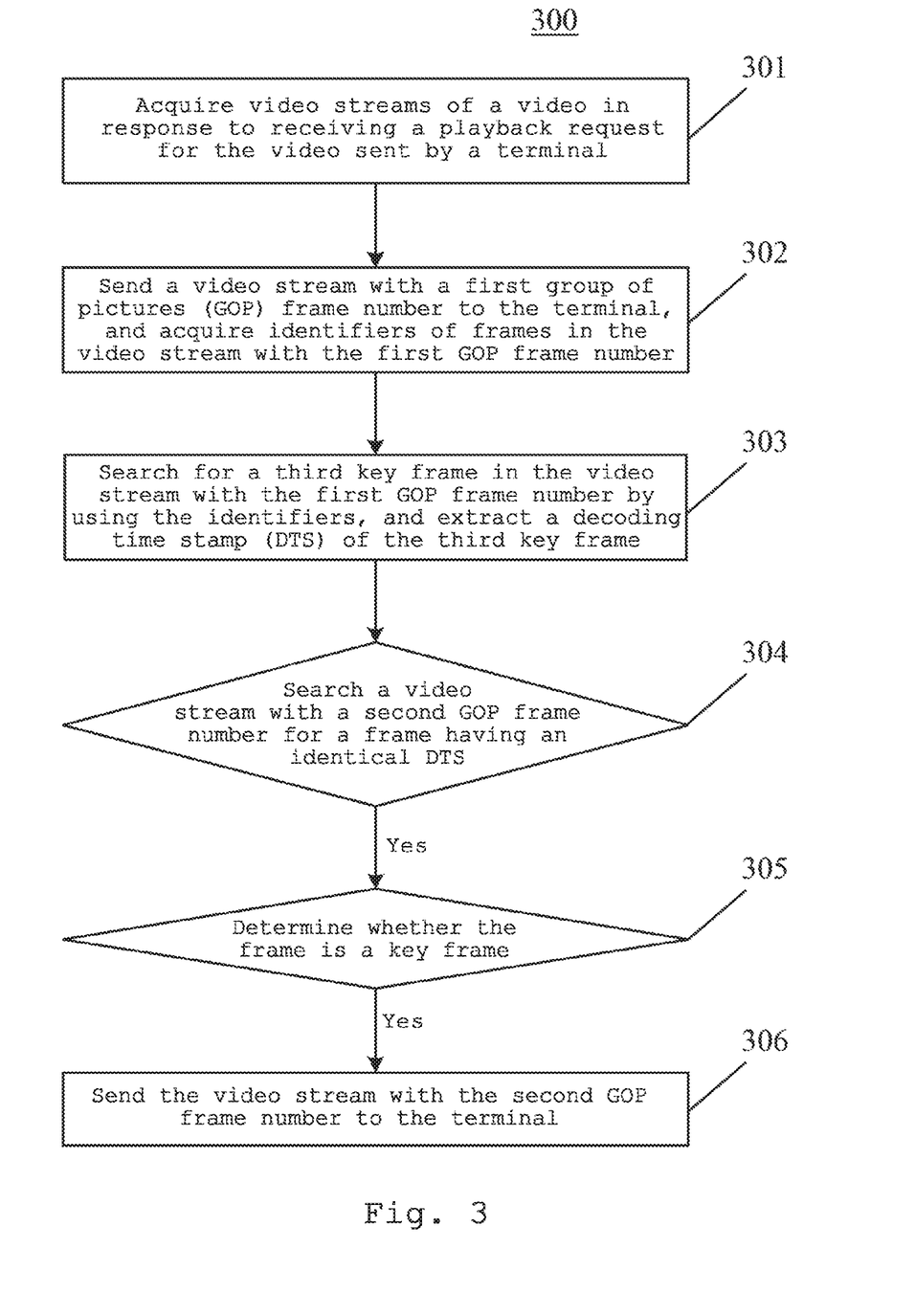
FIG. 3 is a flowchart of another embodiment of a method for switching video streams according to the present application.

Further referring to FIG. 3, it shows a procedure 300 of another embodiment of a method for switching video streams.

The procedure 300 of the method for switching video streams includes the following steps:

Step 301, video streams of a video are acquired in response to receiving a playback request for the video sent by a terminal.

In this embodiment, in response to receiving a playback request for a video sent by a user using a terminal in a wired connection approach or a wireless connection approach, an electronic device (for example, the server shown in FIG. 1) on which the method for switching video streams runs may acquire video streams of the video that the user requests to playback, where, the video stream refers to transmission of video data, for example, it can be processed through the network as a stable and successive stream, and due to streaming, a client browser or plug-in can display multimedia data before the whole file is transmitted completely. The video streams may include a video stream with a first GOP frame number and a video stream with a second GOP frame number, a GOP is a group of successive pictures, and the GOP frame number may be the frame number counting from a first key frame to a frame before a second key frame in a video stream, the second key frame being a subsequent key frame next to the first key frame, where the key frame may be referred to as an I frame, and may also be referred to as an Intra Picture, the I frame is generally the first frame of each GOP, which is moderately compressed to serve as a reference point of random access, and may also be considered as an image.

The first GOP frame number should be less than the second GOP frame number.

Step 302, the video stream with the first GOP frame number is sent to the terminal, and identifiers of frames in the video stream with the first GOP frame number are acquired.

In this embodiment, after the video stream with the first GOP frame number and the video stream with the second GOP frame number are acquired in Step 301, the electronic device may send the video stream with the first GOP frame number to the terminal device. In the process of sending the video stream, the electronic device may acquire an identifier of a frame each time a picture of the frame is sent. Before the video stream is sent, the type of each frame of the video stream may be indicated at a header of such frame, for example, in H.264, the type of the frame may be indicated in slice header, and the electronic device may acquire the identifier of the frame by checking the flag bit.

Step 303, a key frame in the video stream with the first GOP frame number is searched for by using the identifiers, and a DTS of the key frame is extracted.

In this embodiment, the video stream with the first GOP frame number includes an I frame (a key frame), a B frame, and a P frame, and the I frame, the B frame and the P frame each correspond to a different identifier. The electronic device may search for a key frame in the video stream with the first GOP frame number by using the identifiers of the frames acquired in Step 302, and then extract a DTS of the key frame.

Step 304, the video stream with the second GOP frame number is searched for a frame having an identical DTS.

In this embodiment, the electronic device may search the video stream with the second GOP frame number for a frame having an identical DTS to the key frame in the video stream with the first GOP frame number extracted in Step 303. The electronic device may first extract a DTS of each frame in the video stream with the second GOP frame number; then, compare the DTS of each frame with the DTS of the key frame in the video stream with the first GOP frame number to check whether they are identical.

Step 305, it is further determined whether the frame is a key frame in response to finding the frame having the identical DTS.

In this embodiment, when it is found that there is a frame identical to the DTS in the video stream with the second GOP frame number, the electronic device may further determine whether the frame is a key frame.

Step 306, the video stream with the second GOP frame number is sent to the terminal in response determining the frame being the fourth a key frame In this embodiment, when it is determined that the frame is a key frame, the electronic device may send the video stream with the second GOP frame number to the terminal, and stop sending the video stream with the first GOP frame number, that is, switch the sending video stream from the video stream with the first GOP frame number to the video stream with the second GOP frame number.

It can be seen from FIG. 3 that, compared with the embodiment corresponding to FIG. 2, the procedure 300 of the method for switching video streams in this embodiment emphasizes the step of searching for a key frame in the video stream with the first GOP frame number. Therefore, the solution described in this embodiment can accurately find a key frame in the video stream, thereby improving the picture quality of the video more quickly.

Figure 4:
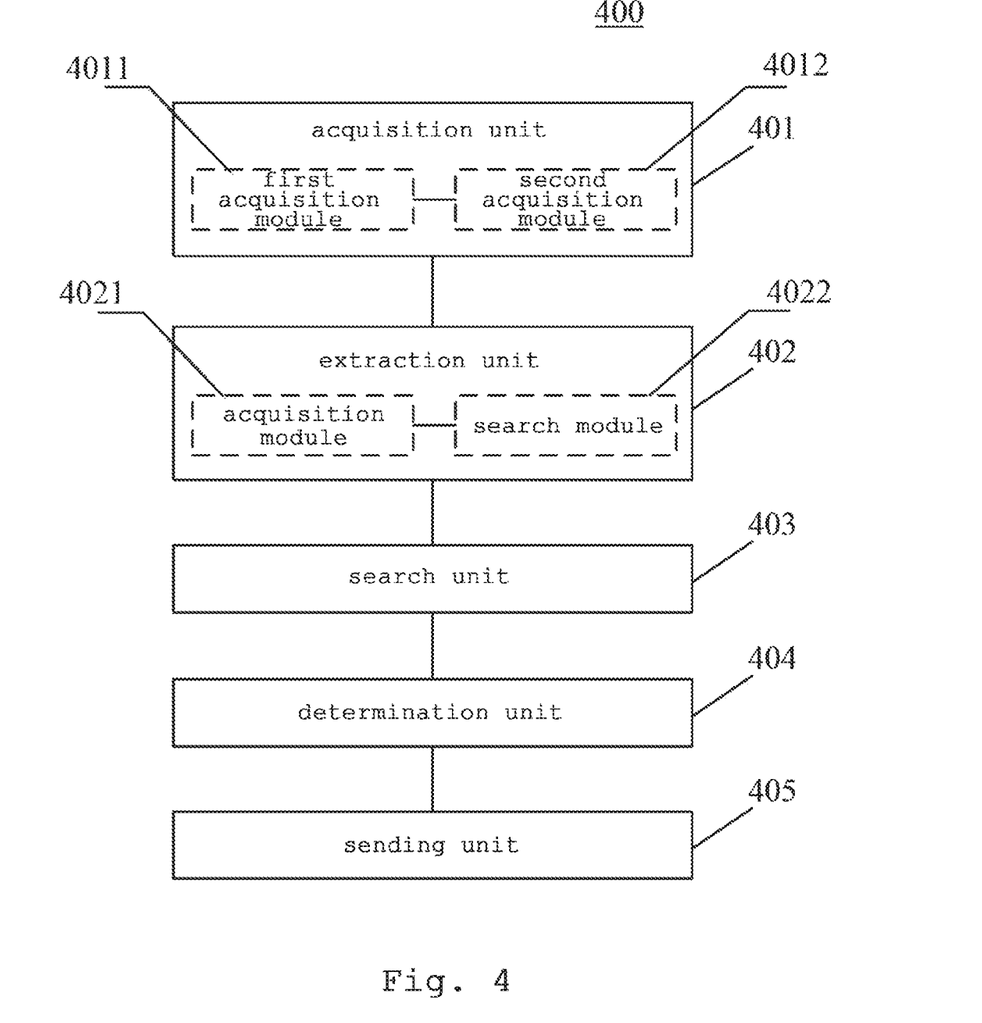
FIG. 4 is a schematic structural diagram of an embodiment of a device for switching video streams according to the present application.

Further referring to FIG. 4, as an implementation of the methods shown in the above drawings, the present application provides an embodiment of a device for switching video streams. The device embodiment is corresponding to the method embodiment shown in FIG. 2, and the device may specifically be applicable to various electronic devices.

As shown in FIG. 4, a device 400 for switching video streams described in this embodiment includes: an acquisition unit 401, an extraction unit 402, a search unit 403, a determination unit 404, and a sending unit 405. The acquisition unit 401 is configured to acquire video streams of a video in response to receiving a playback request for the video sent by a terminal, where the video streams include: a video stream with a first GOP frame number and a video stream with a second GOP frame number, the GOP frame number is the frame number counting from a first key frame to a frame before a second key frame in a video stream, the second key frame being a subsequent key frame next to the first key frame, and the first GOP frame number being less than the second GOP frame number; the extraction unit 402 is configured to send the video stream with the first GOP frame number to the terminal, search for a key frame in the video stream with the first GOP frame number, and extract a DTS of the key frame; the search unit 403 is configured to search the video stream with the second GOP frame number for a frame having an identical DTS; the determination unit 404 is configured to further determine whether the frame is a key frame in response to finding the frame having the identical DTS; and the sending unit 405 is configured to send the video stream with the second GOP frame number to the terminal in response to determining the frame being the fourth a key frame.

In this embodiment, in response to receiving a playback request for a video sent by a user using a terminal in a wired connection approach or a wireless connection approach, the acquisition unit 401 of the device 400 for switching video streams may acquire video streams of the video that the user requests to playback, where, the video stream refers to transmission of video data. The video streams may include a video stream with a first GOP frame number and a video stream with a second GOP frame number, a GOP is a group of successive pictures, and the GOP frame number may be the frame number counting from a first key frame to a frame before a second key frame in a video stream, the second key frame is a subsequent key frame next to the first key frame, where the key frame may be referred to as an I frame, and may also be referred to as an Intra Picture, the I frame is generally the first frame of each GOP, which is moderately compressed to serve as a reference point of random access, and may also be considered as an image. The first GOP frame number should be less than the second GOP frame number.

In this embodiment, after the acquisition unit 401 acquires the video stream with the first GOP frame number and the video stream with the second GOP frame number, the extraction unit 402 may send the video stream with the first GOP frame number to the terminal device. In the process of sending the video stream, the extraction unit 402 may search for a key frame in the video stream with the first GOP frame number, and after the key frame is found, the extraction unit 402 may extract a DTS of the key frame. During code stream analysis of a digital television system, when PES's of the digital television are analyzed, the PES has an unfixed length, and is generally of a length of an access unit. An access unit is a video frame, and may also be an audio frame.

To implement synchronous decoding, a corresponding time mark, namely, the DTS, needs to be inserted before each section.

In this embodiment, the search unit 403 may search the video stream with the second GOP frame number for a frame having an identical DTS to the key frame in the video stream with the first GOP frame number extracted by the extraction unit 402. The search unit 403 may first extract a DTS of each frame in the video stream with the second GOP frame number; then, compare the DTS of each frame with the DTS of the key frame in the video stream with the first GOP frame number to check whether they are identical.

In this embodiment, when it is found that there is a frame identical to the DTS in the video stream with the second GOP frame number, the determination unit 404 may further determine whether the frame is a key frame.

In this embodiment, when it is determined that the frame is a key frame, the sending unit 405 may send the video stream with the second GOP frame number to the terminal, and stop sending the video stream with the first GOP frame number, that is, switch the sending video stream from the video stream with the first GOP frame number to the video stream with the second GOP frame number.

In some alternative implementations of this embodiment, the acquisition unit 401 may include a first acquisition module 4011 and a second acquisition module 4012. When the electronic device receives the playback request information of the video sent by the terminal device, the first acquisition module 4011 may acquire, from a cache of the video stream with the first GOP frame number, the video stream with the first GOP frame number of the video and store it in a first sending queue, and the second acquisition module 4012 acquires, from a cache of the video stream with the second GOP frame number, the video stream with the second GOP frame number of the video and stores it in a second sending queue. Before the acquisition unit 401 acquires the video stream from the cache of the video stream, the acquisition unit 401 may receive a frame of the video, when the frame of the video are received, the frame may be stored in the cache, and if the frame is an I frame, the frame in the cache may be cleared and the I frame is stored in the cache, so that the GOP cache has one, and only one, I frame, and the I frame is the first frame.

In some alternative implementations of this embodiment, a ratio of the second GOP frame number to the first GOP frame number may be a positive integer, for example, if the first GOP frame number is 30 frames, the second GOP frame number may be 60 frames, 90 frames, or the like.

In some alternative implementations of this embodiment, the video stream with the first GOP frame number and the video stream with the second GOP frame number may have identical SPS's. The SPS is used to describe information that is not frequently changed in a video sequence. In H.264 decoding, a code stream is filtered first to obtain a parameter set, the parameter set is a method of enhancing the error recovery capability by improving the structure of a video stream, for example, severe negative effects maybe caused to decoding when bits of some key information (for example, header information of a sequence) are lost; H.264 separates the key information out, and ensures that correct transmission is achieved in an error-prone environment by means of the design of the parameter set.

In some alternative implementations of this embodiment, the extraction unit 402 may include an acquisition module 4021 and a search module 4022. In the process of sending video streams, the acquisition module 4021 may acquire an identifier of a frame each time a picture of the frame is sent.

Before the video stream is sent, the type of each frame of the video stream may be indicated at a header of such frame. Then, the search module 4022 may search for a key frame in the video stream with the first GOP frame number by using the identifiers of the frames acquired by the acquisition module 4021.

Figure 5:
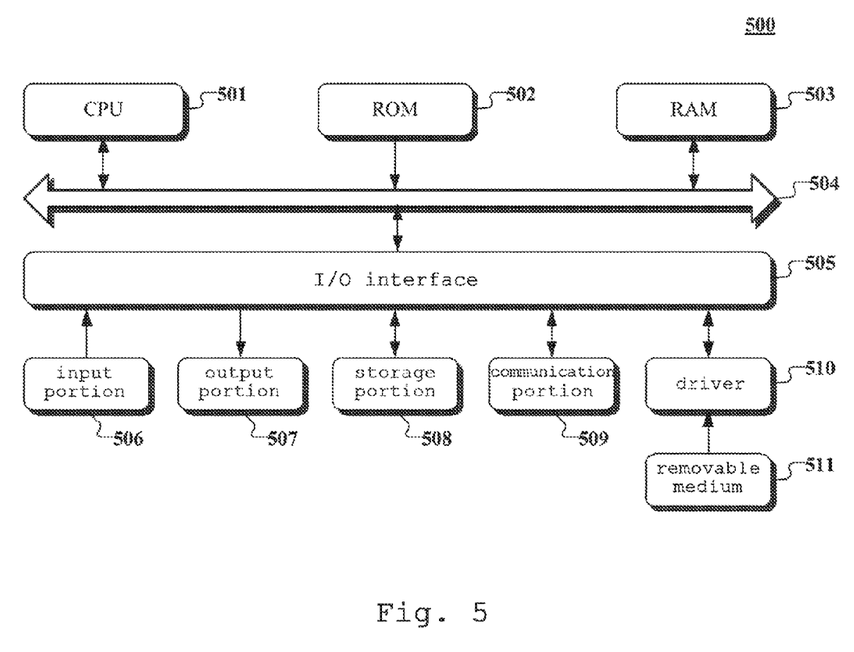
FIG. 5 is a schematic structural diagram of a computer system configured to implement a server of the embodiment of the present application.

Referring to FIG. 5, a schematic structural diagram of a computer system 500 adapted to implement a terminal apparatus or a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an acquisition unit, a sending unit, a search unit, a determination unit and a sending unit, where the names of these units or modules are not considered as a limitation to the units or modules. For example, the acquisition unit may also be described as "a unit for acquiring video streams of a video."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire video streams of a video in response to receiving a playback request for the video sent by a terminal, the video streams comprising: a video stream with a first group of pictures (GOP) frame number and a video stream with a second GOP frame number, a GOP frame number being a number of frames counting from a first key frame to a frame before a second key frame in a video stream, the second key frame being a subsequent key frame next to the first key frame, and the first GOP frame number being less than the second GOP frame number; send the video stream with the first GOP frame number to the terminal, searching for a third key frame in the video stream with the first GOP frame number, and extracting a decoding time stamp (DTS) of the third key frame; search the video stream with the second GOP frame number for a frame having an identical DTS; determine whether the frame is a fourth key frame in response to finding the frame having the identical DTS; and send the video stream with the second GOP frame number to the terminal in response to determining the frame being the fourth key frame.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for switching video streams, comprising:
   acquiring video streams of a video in response to receiving a playback request for the video sent by a terminal, the video streams comprising:
      a video stream with a first group of pictures (GOP) frame number and
      a video stream with a second GOP frame number,
         a GOP frame number being a number of frames counting from a first key frame to a frame before a second key frame in a video stream,
         the second key frame being a subsequent key frame next to the first key frame, and
         the first GOP frame number being less than the second GOP frame number;
   sending the video stream with the first GOP frame number to the terminal,
   searching for a third key frame in the video stream with the first GOP frame number, and
   extracting a decoding time stamp (DTS) of the third key frame;
   searching the video stream with the second GOP frame number for a frame having a DTS identical to the extracted DTS;
   determining whether the frame is a fourth key frame in response to finding the frame having the identical DTS; and
   sending the video stream with the second GOP frame number to the terminal in response to determining the frame being the fourth key frame.

2. The method according to claim 1, wherein the acquiring video streams of the video comprises:
   acquiring the video stream with the first GOP frame number of the video from a cache of the video stream with the first GOP frame number, and storing the video stream with the first GOP frame number in a first sending queue; and
   acquiring the video stream with the second GOP frame number of the video from a cache of the video stream with the second GOP frame number, and storing the video stream with the second GOP frame number in a second sending queue.

3. The method according to claim 1, wherein a ratio of the second GOP frame number to the first GOP frame number is a positive integer.

4. The method according to claim 3, wherein the video stream with the first GOP frame number and the video stream with the second GOP frame number have identical sequence parameter sets.

5. The method according to claim 1, wherein the searching for a third key frame in the video stream with the first GOP frame number comprises:
   acquiring identifiers of frames in the video stream with the first GOP frame number; and
   searching for the third key frame in the video stream with the first GOP frame number by using the identifiers.

6. A device for switching video streams, comprising:
   at least one processor; and
   a memory storing instructions, which when executed by the at least one processor, cause the at least one processor to perform operations, the operations comprising:
      acquiring video streams of a video in response to receiving a playback request for the video sent by a terminal, the video streams comprising:
         a video stream with a first group of pictures (GOP) frame numbers and a video stream with a second GOP frame number, a GOP frame number being a frame number counting from a first key frame to a frame before a second key frame in a video stream, the second key frame being a subsequent key frame next to the first key frame, and the first GOP frame number being less than the second GOP frame number;
      sending the video stream with the first GOP frame number to the terminal, search for a third key frame in the video stream with the first GOP frame number, and extract a decoding time stamp (DTS) of the third key frame;

searching the video stream with the second GOP frame number for a frame having a DTS identical to the extracted DTS;

determining whether the frame is a fourth key frame in response to finding the frame having the identical DTS; and sending the video stream with the second GOP frame number to the terminal in response to determining the frame being the fourth key frame.

7. The device according to claim 6, wherein the acquiring video streams of the video comprises:

acquiring the video stream with the first GOP frame number of the video from a cache of the video stream with the first GOP frame number, and store the video stream with the first GOP frame number in a first sending queue; and acquiring the video stream with the second GOP frame number of the video from a cache of the video stream with the second GOP frame number, and store the video stream with the second GOP frame number in a second sending queue.

8. The device according to claim 6, wherein a ratio of the second GOP frame number to the first GOP frame number is a positive integer.

9. The device according to claim 8, wherein the video stream with the first GOP frame number and the video stream with the second GOP frame number have identical sequence parameter sets.

10. The device according to claim 6, wherein the searching for a third key frame in the video stream with the first GOP frame number comprises:

acquiring identifiers of frames in the video stream with the first GOP frame number; and searching for a key frame in the video stream with the first GOP frame number by using the identifiers.

11. A non-transitory computer storage medium storing a computer program, which when executed by one or more processors, cause the one or more processors to perform operations, the operations comprising:

acquiring video streams of a video in response to receiving a playback request for the video sent by a terminal, the video streams comprising:

a video stream with a first group of pictures (GOP) frame number and a video stream with a second GOP frame number, a GOP frame number being a number of frames counting from a first key frame to a frame before a second key frame in a video stream, the second key frame being a subsequent key frame next to the first key frame, and the first GOP frame number being less than the second GOP frame number;

sending the video stream with the first GOP frame number to the terminal, searching for a third key frame in the video stream with the first GOP frame number, and extracting a decoding time stamp (DTS) of the third key frame;

searching the video stream with the second GOP frame number for a frame having a DTS identical to the extracted DTS;

determining whether the frame is a fourth key frame in response to finding the frame having the identical DTS; and sending the video stream with the second GOP frame number to the terminal in response to determining the frame being the fourth key frame.

12. The non-transitory computer storage medium according to claim 11, wherein the acquiring video streams of the video comprises:

acquiring the video stream with the first GOP frame number of the video from a cache of the video stream with the first GOP frame number, and storing the video stream with the first GOP frame number in a first sending queue; and acquiring the video stream with the second GOP frame number of the video from a cache of the video stream with the second GOP frame number, and storing the video stream with the second GOP frame number in a second sending queue.

13. The non-transitory computer storage medium according to claim 11, wherein a ratio of the second GOP frame number to the first GOP frame number is a positive integer.

14. The non-transitory computer storage medium according to claim 11, wherein the video stream with the first GOP frame number and the video stream with the second GOP frame number have identical sequence parameter sets.

15. The non-transitory computer storage medium according to claim 11, wherein the searching for a third key frame in the video stream with the first GOP frame number comprises:

acquiring identifiers of frames in the video stream with the first GOP frame number; and searching for the third key frame in the video stream with the first GOP frame number by using the identifiers.

* * * * *